(12) United States Patent
Wahlroos et al.

(10) Patent No.: US 7,075,764 B2
(45) Date of Patent: Jul. 11, 2006

(54) METHOD AND ARRANGEMENT FOR REDUCING STRESS IN ELECTRICAL NETWORK

(75) Inventors: Ari Wahlroos, Vaasa (FI); Rami Aihinen, Vaasa (FI)

(73) Assignee: ABB Oy, Helsinki (FI)

( * ) Notice: Subject to any disclaimer, the term of this patent is extended or adjusted under 35 U.S.C. 154(b) by 473 days.

(21) Appl. No.: 10/686,778

(22) Filed: Oct. 17, 2003

(65) Prior Publication Data

US 2004/0130835 A1    Jul. 8, 2004

Related U.S. Application Data

(63) Continuation of application No. PCT/FI02/00448, filed on May 24, 2002.

(30) Foreign Application Priority Data

May 25, 2001    (FI)    ................................. 20011099

(51) Int. Cl.
*H02H 7/00*    (2006.01)
(52) U.S. Cl. ....................................... 361/63
(58) Field of Classification Search ................... 361/63
See application file for complete search history.

(56) References Cited

U.S. PATENT DOCUMENTS

| | | | |
|---|---|---|---|
| 3,824,445 A * | 7/1974 | Etter et al. ..................... | 363/68 |
| 4,724,391 A | 2/1988 | Blahous ....................... | 324/424 |
| 4,879,477 A | 11/1989 | Krüger ........................ | 307/239 |
| 6,094,013 A | 7/2000 | Goller et al. ................ | 315/282 |
| 7,010,436 B1 * | 3/2006 | Larsson et al. ................ | 702/57 |

FOREIGN PATENT DOCUMENTS

| | | |
|---|---|---|
| DE | 3560974 | 12/1987 |
| DE | 19641116 | 4/1998 |
| EP | 0152739 | 8/1985 |
| JP | 60055604 | 3/1985 |
| JP | 1099432 | 4/1989 |
| JP | 2179220 | 7/1990 |
| JP | 3128622 | 5/1991 |
| RU | 2093943 | 10/1997 |
| WO | 00/07273 | 2/2000 |

OTHER PUBLICATIONS

Brouchure—Switchsync—Microprocessor based relay for synchronous operation of circuit breakers. Reduces transients and improves power quality. ABB—pp. 1-8.

* cited by examiner

*Primary Examiner*—Stephen W. Jackson
(74) *Attorney, Agent, or Firm*—Dykema Gossett PLLC

(57) ABSTRACT

A method and arrangement for reducing stress in an electrical network. In the method and arrangement, an inrush current caused by a network component or part connected to the live electrical network is minimized, the network component or part being disconnected from and connected to the live electrical network by opening and closing a circuit breaker (3). The current of at least one phase (A, B, C) of the network component or part is measured, the breaking-off moment of the current is determined after the circuit breaker (3) is opened, the optimum closing moment ($T_{OPTIMUM}$) of the circuit breaker (3) is determined on the basis of the breaking-off moment of the current, and the circuit breaker (3) is closed in such a manner that it closes at the optimum closing moment ($T_{OPTIMUM}$).

26 Claims, 4 Drawing Sheets

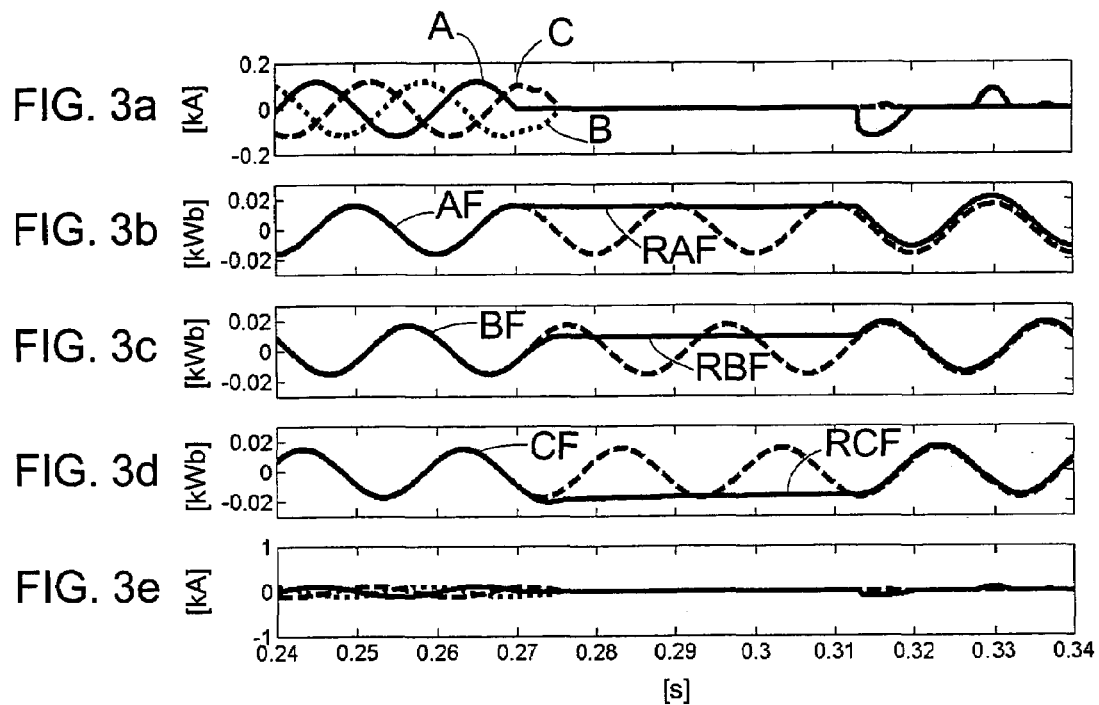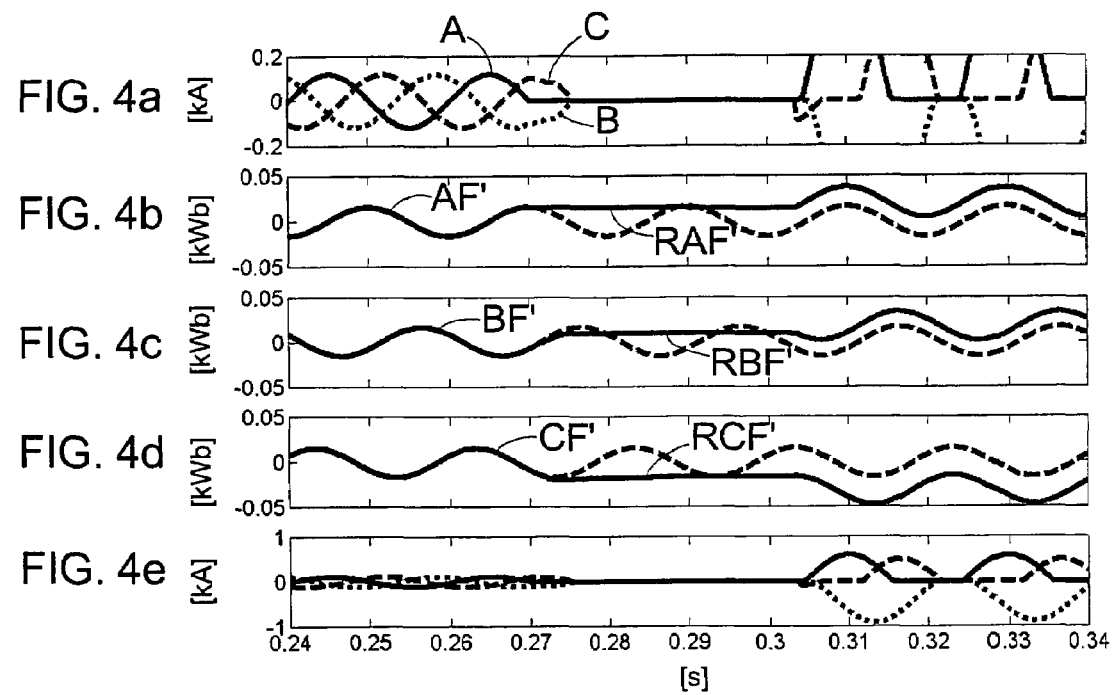

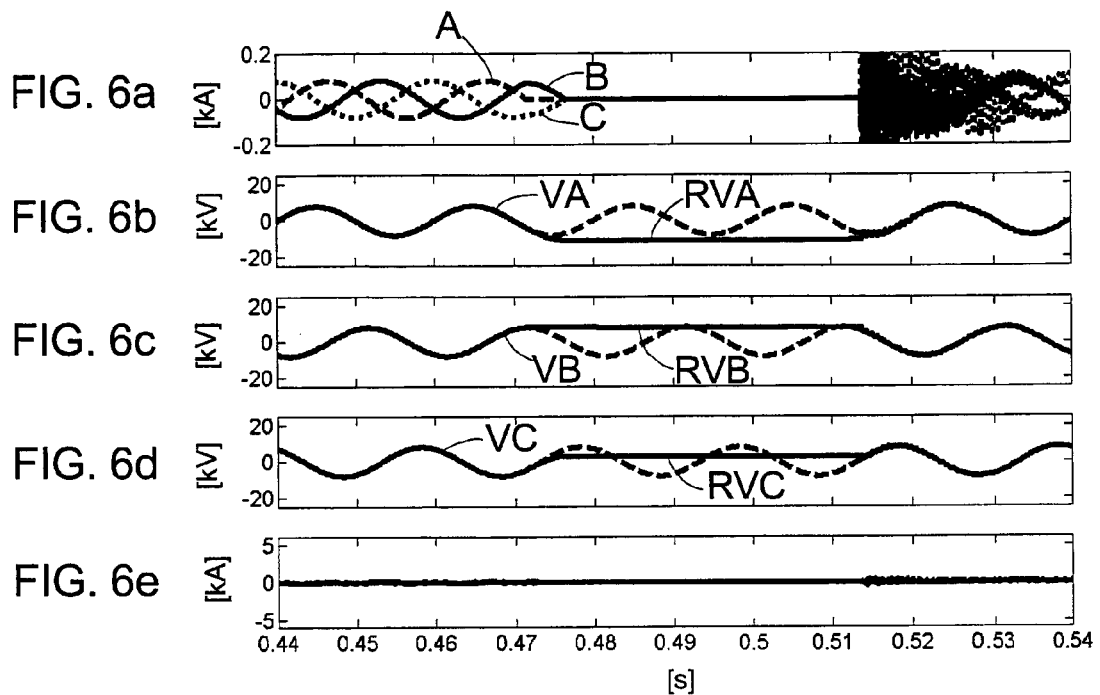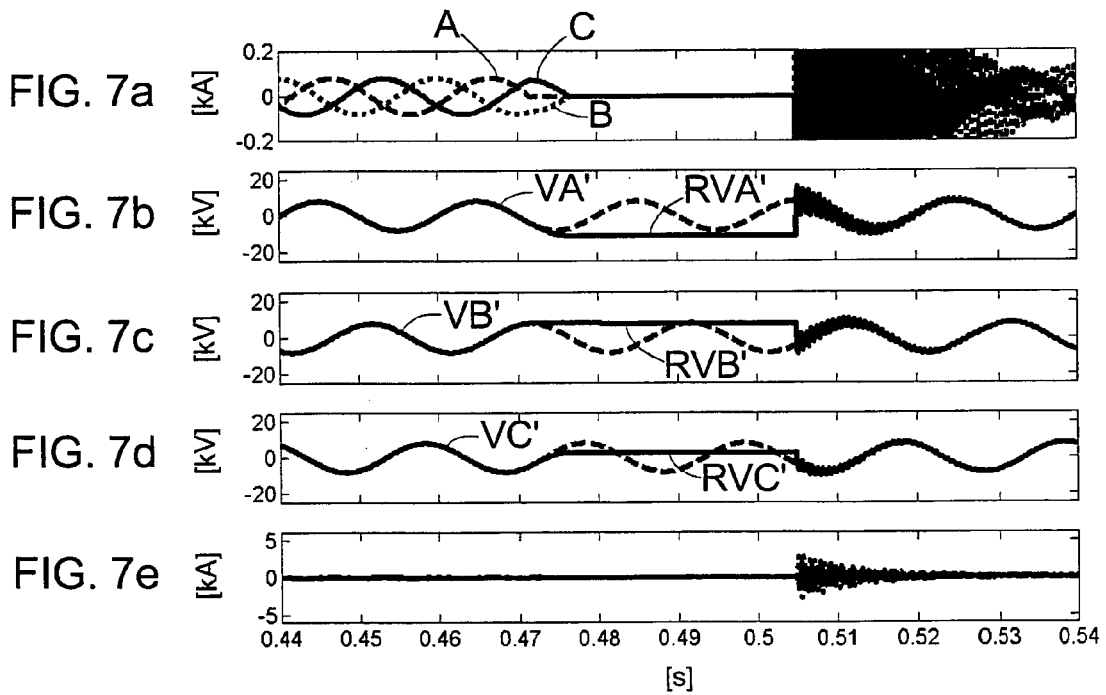

METHOD AND ARRANGEMENT FOR REDUCING STRESS IN ELECTRICAL NETWORK

Figure 1:
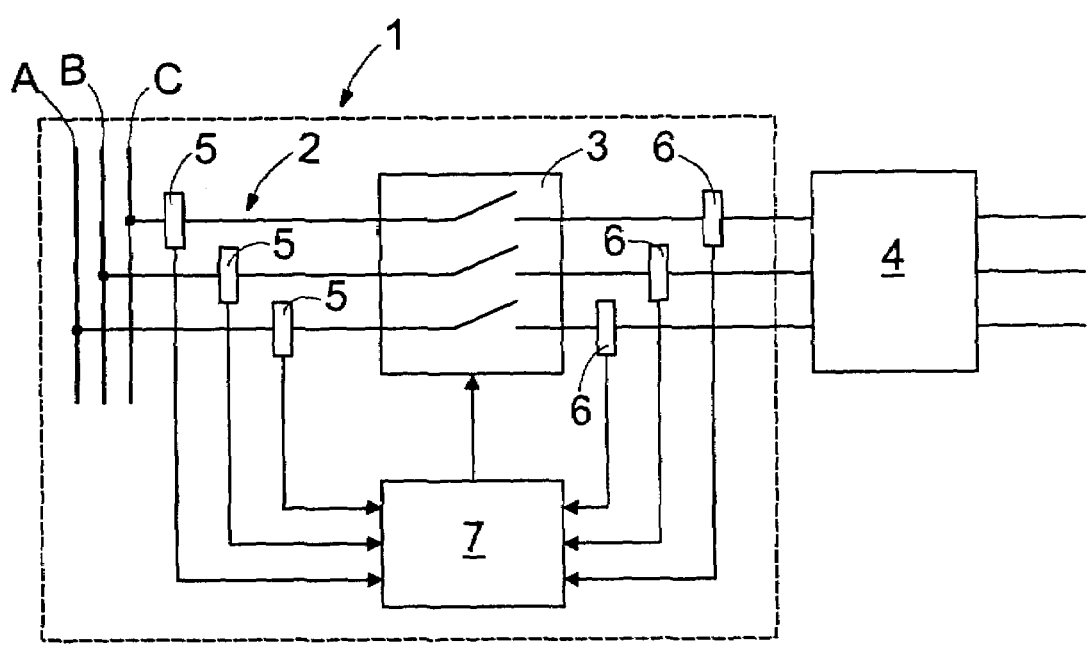

This application is a Continuation Application PCT/FI02/00448 filed May 24, 2002 which designated the U.S. and was published under PCT Article 21(2) in English.

The invention relates to a method for reducing stress in an electrical network, in which method an inrush current caused by a network component or part connected to the live electrical network is minimized, the network component or part being disconnected from and connected to the live electrical network by opening and closing a circuit breaker.

The invention further relates to an arrangement for reducing stress in an electrical network, the arrangement comprising a circuit breaker and the arrangement being arranged to minimize an inrush current caused by a network component or part connected to the live electrical network, the network component or part being arranged to be disconnected from and connected to the live electrical network by opening and closing the circuit breaker.

Protective devices, i.e. protection relays, monitoring the state of an electrical network are used to protect components, such as power transformers, compensating capacitors or filter circuits, connected to the network from faults, such as short-circuits and earth faults, occurring in electrical networks. After detecting a fault, the protection relays disconnect the component or network part to be protected from the rest of the network by opening a circuit breaker, whereby the supply of voltage and current to the component or network part to be protected is discontinued. In high-speed automatic reclosing, the supply is interrupted, i.e. the circuit breaker is opened, for a short time, for instance a few tenths of a second, after which time the circuit breaker is closed again. If the fault has not disappeared during this time, delayed automatic reclosing is used, i.e. the circuit breaker is typically re-opened for approximately 1 to 3 minutes, after which time the circuit breaker is again closed. The circuit breaker can naturally also be opened because of some other reason than a fault in the network. When power transformers and capacitors are reconnected to the network, the closing of the circuit breaker may lead to a considerable inrush current of the transformer or compensating capacitor, if the internal state of the transformer, capacitor or filter circuits is unfavourable to the voltage phase, i.e. amplitude of the voltage, and polarity at the closing moment of the circuit breaker. In connection with a transformer, the internal state refers to the remanence fluxes remaining in different phases in the core of the transformer at the time the circuit breaker is opened, and in connection with a capacitor and filter circuits, it refers to the charge remaining in different phases. The determinant factor with respect to the remanence fluxes remaining in the transformer or the charges remaining in the capacitors is the value of the voltage at the breaking-off moment of current. The two factors affecting most the generation of an inrush current are the closing moment of the circuit breaker and the remanence fluxes of the transformer or the charge of the capacitors or filter circuits at the time of switching. An inrush current may cause damage to the network or the devices connected to it and faulty operation of the protection relays, causing unnecessary switching off of voltage and current, if the inrush currents are not taken into consideration in relay settings during the closing of the circuit breaker. An inrush current is a considerable problem especially in high-speed automatic reclosing. The charges of the capacitors and filter circuits discharge with time, but since the time constant of discharge is typically several minutes, considerable inrush currents can also occur with delayed automatic reclosing.

Different ways have been developed to prevent the occurrence of an inrush current or to minimize its size. One known solution uses a synchronized closing of the circuit breaker, in which the closing moment is timed in such a manner that the inrush current is minimized. A requirement for the functioning of the solution is that the charges in the capacitor batteries at the time of opening the circuit breaker have had time to discharge, i.e. a long time, typically several minutes, has elapsed from the opening. The solution also works when the supply current has broken off appropriately when the circuit breaker is opened, so that no remanence fluxes remain in the transformer or no charge remains in the capacitors, which is, however, impossible when a three-phase network without a neutral conductor is used.

Another known solution uses a synchronized opening of the circuit breaker, whereby the disconnection of the transformer or capacitor or filter circuit is arranged to take place at the same moment each time so that the remanence fluxes remaining in the core of the transformer or the charges remaining in the capacitors would in each disconnection always have the same values. When a suitable closing moment is then selected, it is possible to minimize the generation of an inrush current. A problem with the solution is, however, that the optimum closing moment, with which the inrush current is minimized, must be defined experimentally by field tests. In addition, the solution is only suited for use with single-pole circuit breakers so that the opening and closing moments of different phases can be determined independently. Further, the assumption that the transformer remanence fluxes or the capacitor charge would remain at constant values is not realistic, because the current of an individual phase is not always disconnected at the same moment. The solution thus entails a risk that a closing time determined experimentally is not always optimal. Because the value of the voltage at the actual breaking-off moment of the current determines the value of the transformer remanence fluxes or the value of the charge remaining in the capacitors, a shift in the actual breaking-off moment of the current may result in that at the experimentally determined closing moment, the remanence fluxes strengthen the phase fluxes or the capacitor charge is increased, and the amplitude of the resulting inrush current is multiplied.

German publication 19,641,116 presents a solution for reducing the inrush current of a transformer by determining the remanence flux remaining in the core of the transformer at the time of opening the circuit breaker, which can then be taken into consideration at the time of closing the circuit breaker in such a manner that the inrush current of the transformer is as small as possible. Two alternative solutions are disclosed for determining the remanence flux remaining in the core of the transformer. The first solution uses either external or internal transformer voltage sensors that measure the voltage acting on the core of the transformer, and on the basis of the measurement, it is possible to determine the remanence flux remaining in the core of the transformer. A problem with this solution is, however, that arranging the voltage sensors to the transformer adds to both equipment and installation costs. The second alternative utilizes a physical transformer model that determines the flux of an individual transformer core as a function of time. The model also comprises a hysteresis model depicting the density of the magnetic flux of the transformer core as a function of the strength of the magnetic field. The hysteresis model is needed, because the simulation of the flux circulating in the transformer core must follow the hysteresis model so as to be able to correctly calculate the behaviour of the flux in iron. In the remanence flux determination based on a transformer model, the voltage and/or current values of an idle transformer are recorded until the values have decreased to zero. The remanence flux is the final value of the flux, when the voltage and current have decreased to zero. These stored values are used as input quantities of the model. A problem with the remanence flux determination based on a physical transformer model is that the transformer model is transformer-specific. In addition, the initial state required in the calculation can only be defined in stationary conditions, which is why measuring values on the voltage and/or current measurement must be stored at least during one network cycle before the circuit breaker is opened.

It is an object of the present invention to provide a novel solution for reducing the inrush current generated at the closing of a circuit breaker.

The method of the invention is characterized by measuring the current of at least one phase of a network component or part, determining the breaking-off moment of the current after the circuit breaker is opened, determining an optimum closing moment of the circuit breaker on the basis of the breaking-off moment of the current, and closing the circuit breaker in such a manner that it closes at the optimum closing moment.

The arrangement of the invention is characterized in that it comprises means for measuring the current of at least one phase of a network component or part, means for determining the breaking-off moment of the current after the circuit breaker is opened, means for determining an optimum closing moment of the circuit breaker on the basis of the breaking-off moment of the current, and means for closing the circuit breaker in such a manner that it closes at the optimum closing moment.

According to the essential idea of the invention, the stress in an electrical network is reduced by minimizing the inrush current caused by a network component or part connected to the live electrical network in a situation, in which the network component or part is first disconnected from and then re-connected to the live electrical network by opening and closing a circuit breaker. According to the essential idea, the current of at least one phase of the network component or part is measured, the breaking-off moment of the current is determined after the circuit breaker is opened, an optimum closing moment of the circuit breaker is defined on the basis of the breaking-off moment of the current, and the circuit breaker is closed in such a manner that it closes at the optimum closing moment. According to a preferred embodiment of the invention, the electrical network is a three-phase network, the circuit breaker is a triple-pole circuit breaker, the current is measured in each of the three phases, and one common computational breaking-off moment of the currents of all phases is determined on the basis of the breaking-off moments of the currents of all phases, on the basis of which the optimum closing moment of the circuit breaker is defined.

The invention provides the advantage that in a very simple manner, it is possible to minimize the inrush current of a network component, such as a transformer or compensating capacitor, or a network part when it is re-connected to a live electrical network by closing a circuit breaker. The circuit breaker can be opened at an arbitrary moment and a synchronized opening of the circuit breaker is not needed. The closing moment of the circuit breaker is synchronized with the actual breaking-off moment of the current and not with an assumed moment as is done in synchronized opening, during which in an unfavourable situation, considerable inrush currents may occur.

The invention is described in greater detail in the attached drawings, in which

Figure 2:
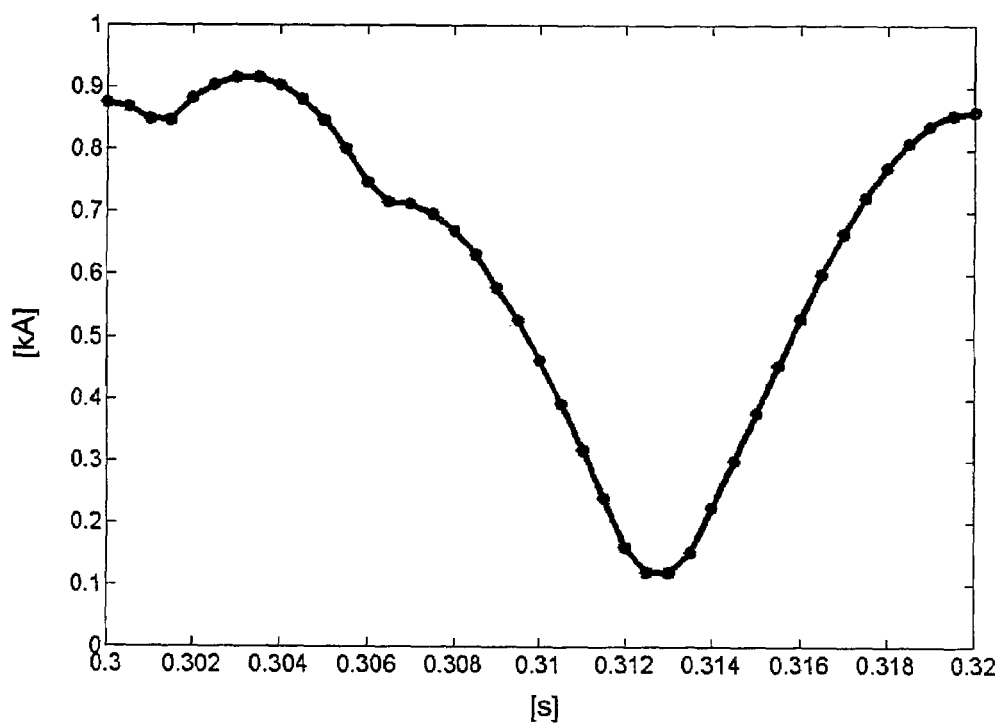
Figure 5:
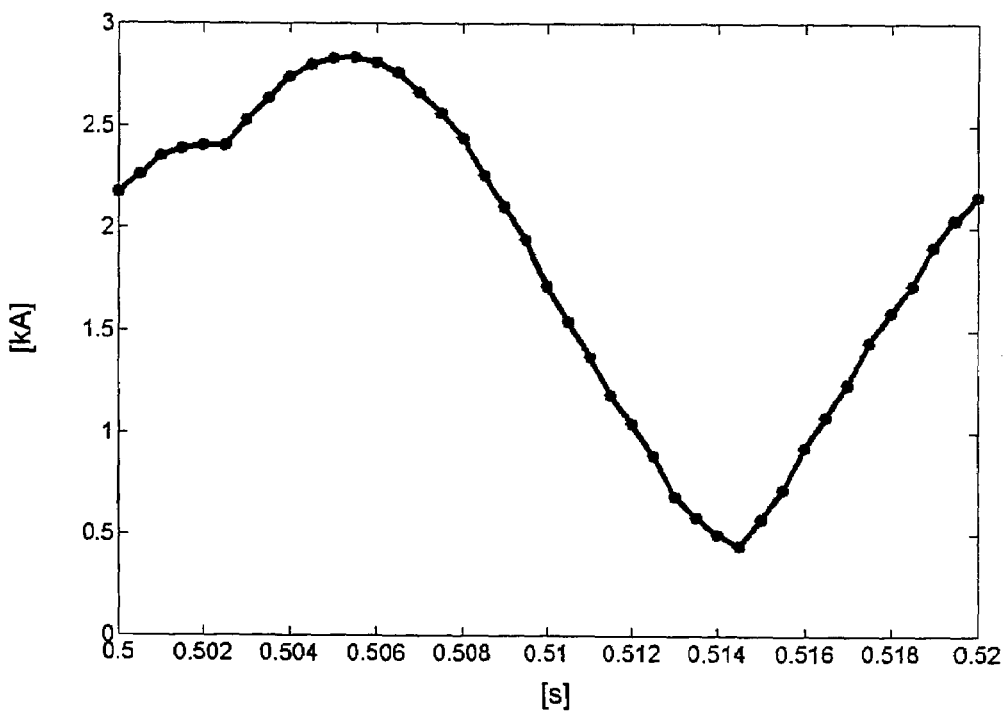

FIG. 1 is a schematic representation of an arrangement of the invention for reducing the inrush current of a transformer, FIG. 2 is a schematic representation of the amplitude of the inrush current of a transformer when the transformer having remanence flux is connected to a live network at different times, FIGS. 3a to 3e and 4a to 4e are schematic representations of the behaviour of the phase fluxes, remanence fluxes and inrush current of a transformer when the circuit breaker is closed both at the optimum and the worst possible moment with respect to the generation of the inrush current, FIG. 5 is a schematic representation of the amplitude of the inrush current of a capacitor when the capacitor having residual charge is connected to a live network at different times, and FIGS. 6a to 6e and 7a to 7e are schematic representations of the behaviour of the phase voltages, residual charges, i.e. residual voltages, and inrush current of a capacitor when the circuit breaker is closed both at the optimum and the worst possible moment with respect to the generation of the inrush current.

FIG. 1 is a schematic representation of a part of a feeder 2 from a substation 1 in a three-phase electric distribution network, i.e. electrical network. A dashed line marks the substation 1. Several feeders typically run from a substation, but for the sake of clarity, FIG. 1 only shows one feeder. The feeder 2 is three-phased, i.e. it has phase lines or phases A, B and C. The feeder 2 has a circuit breaker 3 for making the feeder 2 live by closing the circuit breaker 3 or dead by opening the circuit breaker 3 in a manner known per se by a person skilled in the art. The circuit breaker 3 is a triple-pole circuit breaker, i.e. the supply of all three phases A, B and C is opened with one control command arriving at the circuit breaker. In FIG. 1, the circuit breaker 3 is shown in its open position. FIG. 1 further shows a power transformer 4 or transformer 4. The transformer 4 transforms the voltage of the electrical network from one voltage level to another in a manner known per se. The transformer 4 is for instance a typical 20/0.4 kV distribution transformer with supply lines to households, for instance, from its low-voltage side. FIG. 1 further shows voltage-measuring means arranged on the supply side of the circuit breaker 3 that are preferably voltage sensors 5 and arranged to measure the voltage of each phase in a manner known per se to a person skilled in the art. FIG. 1 also shows current measuring means arranged on the load side of the circuit breaker 3 that are preferably current sensors 6 and arranged to measure the current of each phase in a manner known per se to a person skilled in the art. The voltage and current measurement data are led to a control device 7 that is a microprocessor-based numeric protection relay, for instance. The control device 7 has sampling means for sampling momentary values of the voltage and current from the continuous measurement data and one or more memory units for storing the measured values. The control device 7 further has a processing unit, in which directly measured values and/or stored measurement values are processed in such a manner that they can for instance be compared with limit values stored in the memory unit to detect a possible fault either in the feeder 2, in which the control device 7 is located, or in some other feeder that is directly coupled to the same electrical network. The detection of a fault is typically based on either voltage measurement only or on both voltage and current measurement. After detecting a fault, the control device 7 transmits a control command to the circuit breaker 3 to open the circuit breaker 3. The circuit breaker 3 can also be opened either manually or automatically due to some other reason than a fault in the network. After a preset time, which in high-speed automatic reclosing is for instance a few tenths of a second and in delayed automatic reclosing is typically from one to three minutes, the control device 7 transmits a control command to the circuit breaker 3 to close the circuit breaker 3. Typically, every time the circuit breaker 3 is closed, the transformer 4 causes an inrush current that generates both thermal and dynamic stress in the electrical network and may thus cause a malfunction in the network components or devices connected to the network.

In the following, the solution of the invention for minimizing the inrush current of the transformer 4 is described by means of FIGS. 2, 3a to 3e and 4a to 4e.

FIG. 2 shows by way of example a schematic representation of the amplitude of the inrush current of the transformer 4 when the transformer 4 having remanence flux is connected to the network at different times. The vertical axis shows the amplitude of the inrush current in kiloamperes kA and the horizontal axis shows time in seconds. The closing moment of the circuit breaker 3 is varied at 0.5 millisecond intervals during a period of t=0.3 to 0.32 seconds, i.e. during one network cycle, when the power frequency is 50 Hz. In the case shown in FIG. 2, the highest inrush current is reached at the closing moment of the circuit breaker 3 of t=0.3035 seconds and the lowest surge at t=0.313 seconds.

FIGS. 3a to 3e are schematic representations of the behaviour of the remanence fluxes of the different phases and the inrush current of the transformer 4 in a case, where the circuit breaker 3, which at the time instant 0.27 seconds has started to open, is closed at the time instant t=0.313 seconds, i.e. closing occurs at the time instant corresponding to the lowest in rush current of FIG. 2. FIGS. 4a to 4e in turn are schematic representations of a corresponding situation, in which the circuit breaker 3 is closed at the time instant t=0.3035 seconds, i.e. at the time instant corresponding to the highest inrush current of FIG. 2. FIGS. 3a and 4a show the supply currents of the phases A, B and C in kiloamperes kA, FIGS. 3b and 4b the A-phase flux AF and AF' of the transformer, FIGS. 3c and 4c, the B-phase flux BF and BF' of the transformer, and FIGS. 3d and 4d the C-phase flux CF and CF' of the transformer in kilowebers kWb. FIGS. 3e and 4e correspond to FIGS. 3a and 4a except for a change to the scale of the vertical axis. FIGS. 3a and 4a show that when using a triple-pole circuit breaker 3, the phase currents always break off at their natural zero point, i.e. the currents of the phases A, B and C do not break off at the same time. In this case, the current of the phase A breaks off first and then the currents of the phases B and C simultaneously. FIGS. 3b to 3d and 4b to 4d show that the remanence flux values of the phases A, B and C that remain in the transformer 4 core are determined at the break-off moment of the phase current. In FIGS. 3b to 3d, the remanence flux of the phase A is RAF, that of the phase B is RBF and that of the phase C is RCF. The corresponding markings in FIGS. 4b to 4d are RAF', RBF' and RCF'. The descriptors of the phase fluxes AF, AF', BF, BF', CF and CF' in FIGS. 3b to 3d and 4b to 4d are continued by a dashed line after the opening of the circuit breaker 3 to show how the phase fluxes would behave in a normal situation, had the circuit breaker 3 not been opened.

In FIGS. 3a and 4a the current of the phase A breaks off at the time instant $T_A$=0.27025 seconds and the currents of the phases B and C break off at the time instant $T_B$=$T_C$=0.27565 seconds. The circuit breaker 3 is closed after a given predefined number n (n=1, 2, 3, ... ) of network cycles from its opening. The duration of a network cycle is 0.02 seconds at a network frequency of 50 Hz. If the breaking-off moment $T_A$=0.27025 of the current of the phase A was used to determine the closing moment of the circuit breaker 3 and the closing of the circuit breaker 3 was arranged to take place after two network cycles from its opening, the closing moment would be t=0.31025 seconds. If the breaking-off moment $T_B$=$T_C$=0.27565 seconds of the currents of the phases B and C was used to determine the closing moment of the circuit breaker 3 and the closing of the circuit breaker 3 was arranged to take place after two network cycles from its opening, the closing moment would be t=0.31565 seconds. However, FIG. 2 shows that neither of these moments is the optimum closing moment of the circuit breaker 3 for minimizing the inrush current. The optimum closing moment of the circuit breaker 3, i.e. the closing moment that minimizes the occurring inrush current, is based on the common break-off moment $T_{ABC}$ of the currents of all the phases A, B and C that can be defined as a weighted average of the breaking-off moments of the currents of the phases A, B and C from the formula $$T_{ABC}=K_1T_A+K_2T_B+K_3T_C, \quad (1)$$

where $T_A$ is the breaking-off moment of the current of the phase, in which the current breaks off first $T_B$ is the breaking-off moment of the current of the phase, in which the current breaks off second and $T_C$ is the breaking-off moment of the current of the phase, in which the current breaks off third and $K_1$, $K_2$ and $K_3$ are weighting coefficients.

$T_{ABC}$ is thus the computational moment, at which the currents of all the phases A, B and C break off. In a triple-pole circuit breaker 3, i.e. three-phase circuit breaker 3, all phases of which are controlled simultaneously, the closing moment of the circuit breaker 3 must be based on the common computational breaking-off moment $T_{ABC}$ of the currents of the phases A, B and C. After the opening of the circuit breaker 3, its closing takes place preferably after a period corresponding to the whole number of the network cycles, when the phase or amplitude and polarity of the currents and voltages of the different phases A, B and C correspond closely enough to the respective values at the actual breaking-off moment of the current and voltage, when the circuit breaker 3 was opened. The values of the weighting coefficients $K_1$, $K_2$ and $K_3$ may vary and in practice, their values are selected depending on the order, in which the currents of the phases A, B and C break off, as well as their relative breaking-off intervals. Because in the situation shown in FIGS. 3a and 4a, the currents of the phases B and C break off simultaneously, i.e. $T_B=T_C$, by entering into formula (1) $T_A$=0.27025 seconds and $T_B=T_C$=0.27565 seconds, the result is $T_{ABC}$=0.27295 seconds, when the values of the weighting coefficients $K_1$, $K_2$ and $K_3$ result in $K_1$=0.5, $K_2$=0.5 and $K_3$=0 by using formula (2) presented later. If the circuit breaker 3 is to be closed after two network cycles from its opening, the optimum closing moment of the circuit breaker 3 thus becomes $T_{OPTIMUM}$=0.313 seconds, which corresponds to the minimum inrush current of the transformer 4 according to FIG. 2. Comparing both FIGS. 3a and 4a and FIGS. 3e and 4e shows that when closing the circuit breaker 3 at the optimum moment of 0.313 seconds, the inrush current generated in FIG. 3e is very small in comparison with the situation in FIG. 4e, in which the closing moment of the circuit breaker 3 is the worst possible.

Because the breaking-off moments of the phase currents are determined by the grounding method of the network, the values of the weighting coefficients $K_1$, $K_2$ and $K_3$ are also determined on the basis of the grounding method of the network. The example of FIGS. 3 and 4 corresponds to a situation, in which the winding connection of the transformer 4 on the primary side, i.e. circuit breaker 3 side, is ungrounded. Generally, in a situation, where the primary-side winding connection of the transformer 4 is ungrounded, i.e. the connection is a delta connection or an ungrounded star connection, the phase currents break off as shown in FIGS. 3 and 4 in such a manner that first the current of one phase breaks off and then the currents of the remaining two phases break off simultaneously. This is due to the fact that the current of the first phase breaks off at its natural zero crossing point and after this, the currents of the two remaining phases must break off simultaneously, because the circuit only closes through the phases. In a situation, where the network is grounded and the primary-side, i.e. circuit breaker 3 side, winding connection of the transformer 4 is a grounded star connection, the current of each phase breaks off at a different time. This is due to the fact that the current of the first phase breaks off at its natural zero crossing point and after this, the circuit of the two remaining phases can close through the ground. The weighting coefficients $K_1$, $K_2$, $K_3$ can, however, be defined in the same manner both in a grounded and an ungrounded network from the formula:

$$K_1 = A_1(T_B - T_A)/(T_C - T_A)$$

$$K_2 = A_2$$

$$K_3 = A_3(T_C - T_B)/(T_C - T_A), \quad (2)$$

where the values of the coefficients $A_1$, $A_2$ and $A_3$ may vary between 0.4 and 0.6. Preferably, the value of each coefficient $A_1$, $A_2$ and $A_3$ is approximately 0.5. Most preferably, the value of each coefficient $A_1$, $A_2$ and $A_3$ is exactly 0.5. However, it is clear that the values of the coefficients $A_1$, $A_2$ and $A_3$ are selected in such a manner that the sum of the coefficients $K_1$, $K_2$ and $K_3$ is one.

The calculation described above is performed in the processing unit of the control device 7, which is a general-purpose microprocessor or a special-purpose signal processor, for example. The time, during which the circuit breaker 3 is kept open, i.e. the currentless time, is generally set in advance in the memory of the control device 7. When the period in question is about to end, the control device 7 gives the circuit breaker 3 a control command to close. Because mechanical devices, such as circuit breakers, are not ideal, and there is always an operational delay, the control command to close the circuit breaker 3 needs to be transmitted to the circuit breaker 3 earlier by the operational delay D so as to have the circuit breaker 3 close at the optimum closing moment $T_{OPTIMUM}$.

In summary, the solution of the invention for reducing or minimizing the inrush current of a transformer is as follows.

1) The current sensors 6 continuously measure the current of the transformer 4.
2) After the circuit breaker 3 is opened, the processing unit of the control device 7 finds from the current values stored into the memory of the control device 7 when the circuit breaker 3 was opened, the breaking-off moments of the currents of the phases A, B and C and defines their common computational breaking-off moment $T_{ABC}$.
3) The processing unit of the control device 7 determines the optimum closing moment $T_{OPTIMUM}$ of the circuit breaker 3 from the formula $$T_{OPTIMUM} = T_{ABC} + n*T, \quad (3)$$

where n is for instance a preset number of network cycles to lapse from the common computational breaking-off moment $T_{ABC}$ of the phase currents before the circuit breaker 3 is closed, n=1, 2, 3, . . . , and T is the time of one network cycle.
4) The processing unit of the control device 7 transmits a control command to close the circuit breaker 3 at moment $$T_{ABC} + n*T - D, \quad (4)$$

where

D is the operational delay of the circuit breaker 3.

The invention provides the advantage that, in a very simple manner and using a small amount of calculation capacity, the inrush current of the transformer 4 can be minimized when the transformer is re-connected to the live electrical network by closing the circuit breaker 3. The circuit breaker 3 can open at an arbitrary moment, and any impact caused by a fault in the network, for instance, can be quickly prevented and no synchronized opening of the circuit breaker 3 is needed. The closing moment of the circuit breaker 3 is thus synchronized with the actual breaking-off moment of the current and not with an assumed moment as in synchronized opening.

The solution described above is the same in a situation, in which, instead of a transformer 4, there is a compensating capacitor, capacitor, filter circuit or some other charged electrical network component. FIG. 5 is, by way of example, a schematic representation of the amplitude of the inrush current of a capacitor when the capacitor having residual charge is connected to a live network at different times. The closing moment of the circuit breaker is varied at 0.5 millisecond intervals during a period of t=0.5 to 0.52 seconds, i.e. during one network cycle, when the power frequency of the network is 50 Hz. In the case shown in FIG. 5, the highest inrush current is reached at the closing moment of the circuit breaker 3 of t=0.5055 seconds and the lowest surge at t=0.5145 seconds.

FIGS. 6a to 6e are schematic representations of the behaviour of the residual charge and inrush current of different phases of a capacitor in a situation, where the circuit breaker 3 that has started to open at moment 0.47 seconds, is closed at moment t=0.5145 seconds, i.e. the closing occurs at a moment corresponding to the smallest inrush current of FIG. 5. FIGS. 7a to 7e in turn are schematic representations of a corresponding situation, where the circuit breaker 3 is closed at moment t=0.5055 seconds, i.e. at a moment corresponding to the highest inrush current of FIG. 5. FIGS. 6a and 7a show the currents of the phases A, B and C in kiloamperes. FIGS. 6b and 7b show the A-phase voltage VA and VA' of the capacitor, FIGS. 6c and 7c show the B-phase voltage VB and VB' of the capacitor and FIGS. 6d and 7d show the C-phase voltage VC and VC' of the capacitor in kilovolts kV. FIGS. 6e and 7e correspond to FIGS. 6a and 7a except that the scale of the vertical axis has been increased. FIGS. 6a and 7a show again that when using a triple-pole circuit breaker, the phase currents break off at different times, i.e. in this case, the A-phase current breaks off first and then after it, the B-phase and C-phase currents break off simultaneously. FIGS. 6b to 6d and 7b to 7d show that the values of the residual charges or residual voltages of the capacitor phases are determined at the breaking-off moments of the phase currents. In FIGS. 6b to 6d, the residual voltage of the capacitor in the phase A at the breaking-off moment of the current is marked RVA, in the phase B RVB and in the phase C RVC. The corresponding markings in FIGS. 7b to 7d are RVA', RVB' and RVC'. The descriptors of the phase voltages VA, VA', VB, VB', VC and VC' in FIGS. 6b to 6d and 7b to 7d are continued by a dashed line after the opening of the circuit breaker to show how the phase voltages of the capacitor would behave in a normal situation, had the circuit breaker not been opened. FIG. 6a or 6e in turn show that the inrush current of the capacitor is minimal, when the capacitor is re-connected to the network at a calculated optimum closing moment as described above, in comparison with the situation of FIG. 7a or 7e, in which the connection of the capacitor to the network takes place at the worst possible moment.

The closing of the circuit breaker based on the common computational breaking-off moment of all phases is suited for use preferably when the circuit breaker is a triple-pole circuit breaker, i.e. the switching of all phases is done by one common control command. If a three-phase network uses a circuit breaker, in which each phase is controlled separately, the breaking-off moment common to all phases according to formula (1) is not needed, and the closing of each phase is timed on the basis of the breaking-off moment $T_i$, i=A, B or C, of the phase current of the phase in question. The situation is the same in one-phase networks, in which the circuit breaker of only one phase is opened and closed.

The basic or fundamental frequency of the network does not necessarily remain the same, but may vary considerably in different networks or situations. Because the time T of a network cycle is an inverse of the basic frequency of the network, the variation of the basic frequency causes variation in the time T of the network cycle, which may hamper the closing of the circuit breaker at the optimum closing moment. To avoid this situation, a momentary basic frequency of the network can be defined on the basis of the zero crossings of the voltage or current measurement, for instance, in the processing unit of the control device 7. Then, in a situation, in which the basic frequency of the network differs from the rated frequency, it is possible to use the inverse of the momentary frequency of the network instead of the inverse of the rated frequency of the network for the time T of the network cycle, whereby the circuit breaker 3 can be closed at the optimum closing moment regardless of the variation of the network frequency. Depending on the rate of variation of the basic network frequency, the momentary basic frequency of the network is defined either continuously or at given intervals, as required.

The discharging of the residual charge of the capacitor is exponential. During high-speed automatic reclosing, when the currentless interval is very short, the discharging of the residual charge of the capacitor makes no difference. The same applies to delayed automatic reclosing, in which the currentless interval is relatively short. During a long delayed automatic reclosing of capacitor batteries or filter circuits, the residual charge typically discharges to the extent that the inrush current generated can be significant, when the circuit breaker is closed, unless the discharging of the residual charge is not taken into account.

In applications, in which a capacitor battery or filter circuit is connected to the network at short intervals, a clear advantage is achieved, because the solution utilizes the charge remaining in the capacitor battery or filter circuit and there is no need to wait for the discharging of the charge. In fact, the discharging resistance used to discharge the charge in capacitor batteries or filter circuits is, in this respect, purposeless. A further advantage is that the solution can be directly applied to existing one-pole or triple-pole circuit breakers.

The drawings and the related description are only intended to illustrate the idea of the invention. The invention may vary in detail within the scope of the claims. Thus the transformer can be for instance a heavy-duty transformer at a substation or electricity plant that is by means of a circuit breaker arranged to be disconnected from the rest of the electrical network in a manner known per se. Further, the same solution can be utilized with arc suppression coils or other network components containing a ferromagnetic material. The electrical network can be a public distribution network, industrial network, marine network or any other network for the transmission and distribution of electricity known per se, and the basic frequency of the network can be other than 50 Hz. Further, the control device 7 can be a device intended only for closing the circuit breaker, in which case a separate protection relay, for instance, is used for opening the circuit breaker. The opening and closing of the circuit breaker is, however, preferably controlled by one and the same device. In addition to using the solution with a transformer and capacitor or filter circuit, it can also be used when re-connecting parts, such as extensive cable networks or lines, that have a considerable capacitance, to a live network.

The invention claimed is:

1. A method for reducing stress in an electrical network, in which method an inrush current caused by a network component or part connected to the live electrical network is minimized, the network component or part being disconnected from and connected to the live electrical network by opening and closing a circuit breaker, the method comprising measuring the current of at least one phase of the network component or part, determining the breaking-off moment of the current after the circuit breaker is opened, determining an optimum closing moment of the circuit breaker on the basis of the breaking-off moment of the current, and closing the circuit breaker in such a manner that it closes at the optimum closing moment.

2. A method as claimed in claim 1, wherein the electrical network is a three-phase network, the circuit breaker is a triple-pole circuit breaker, the currents of all three phases are measured, and the breaking-off moment of the current is one common computational breaking-off moment of the currents of all phases.

3. A method as claimed in claim 2, wherein the common computational breaking-off moment of the currents is a weighted average of the breaking-off moments of the currents that is calculated from the formula $$T_{ABC}=K_1T_A+K_2T_B+K_3T_C,$$

where $T_{ABC}$ is the common computational breaking-off moment of the currents, $T_A$ is the breaking-off moment of the current of the phase, in which the current breaks off first, $T_B$ is the breaking-off moment of the current of the phase, in which the current breaks off second, $T_C$ is the breaking-off moment of the current of the phase, in which the current breaks off last, and $K_1$, $K_2$ and $K_3$ are weighting coefficients.

4. A method as claimed in claim 3, wherein the weighting coefficients of the breaking-off moments of the currents are calculated from the formula $$K_1=A_1(T_B-T_A)/(T_C-T_A)$$

$$K_2=A_2$$

$$K_3=A_3(T_C-T_B)/(T_C-T_A).$$

5. A method as claimed in claim 4, wherein $A_1$=0.4–0.6, $A_2$=0.4–0.6 and $A_3$=0.4–0.6, preferably $A_1 \approx 0.5$, $A_2 \approx 0.5$ and $A_3 \approx 0.5$.

6. A method as claimed in claim 2, wherein the optimum closing moment of the circuit breaker is $$T_{OPTIMUM}=T_{ABC}+n*T,$$

where $T_{OPTIMUM}$ is the optimum closing moment of the circuit breaker, n is the number of entire network cycles to lapse from the common computational breaking-off moment $T_{ABC}$ of the phase currents before the circuit breaker is closed, n=1, 2, 3, . . . , and T is the time of one network cycle.

7. A method as claimed in claim 6, wherein a control command to close the circuit breaker is given at moment $$T_{ABC}+n*T-D$$

where

D is the operational delay of the circuit breaker.

8. A method as claimed in claim 1, wherein the electrical network is a three-phase network, the circuit breaker is a single-pole controllable circuit breaker, the currents of all three phases are measured, and the breaking-off moments of the currents of all phases are determined and the circuit breaker is closed in such a manner that in each phase, it closes at moment $$T_{OPTIMUM}=T_i+n*t,$$

where $T_i$ is the breaking-off moment of the current of a single phase, i=A, B or C, n is the number of entire network cycles to lapse from the breaking-off moment of the phase current before the circuit breaker is closed, n=1, 2, 3, . . . , and T is the time of one network cycle.

9. A method as claimed in claim 1, wherein the electrical network is a one-phase network and the circuit breaker is closed in such a manner that it closes at moment $$T_{OPTIMUM}=T_i+n*t,$$

where $T_i$ is the breaking-off moment of the current of the phase, i=A, B or C, n is the number of entire network cycles to lapse from the breaking-off moment of the phase current before the circuit breaker is closed, n=1, 2, 3, . . . , and T is the time of one network cycle.

10. A method as claimed in claim 1, comprising further measuring the voltage of at least one phase, determining a momentary basic frequency of the network on the basis of the measurement of either the voltage or the current, and determining the time of the network cycle as an inverse of the momentary basic frequency of the network.

11. A method as claimed in claim 1, wherein the network component is a transformer, arc suppression coil or any other electrical network component containing a ferromagnetic material.

12. A method as claimed in claim 1, wherein the network component is a capacitor, a compensating capacitor, filter circuit or any other charged electrical network component.

13. A method as claimed in claim 1, wherein the network part is a cable line or network.

14. An arrangement for reducing stress in an electrical network, the arrangement comprising a circuit breaker and the arrangement being arranged to minimize an inrush current caused by a network component or part connected to the live electrical network, the network component or part being arranged to be disconnected from and connected to the live electrical network by opening and closing the circuit breaker, the arrangement further comprising
- means for measuring the current of at least one phase of the network component or part,
- means for determining the breaking-off moment of the current after the circuit breaker is opened,
- means for determining an optimum closing moment of the circuit breaker on the basis of the breaking-off moment of the current, and
- means for closing the circuit breaker in such a manner that it closes at the optimum closing moment.

15. An arrangement as claimed in claim 14, wherein the electrical network is a three-phase network, the circuit breaker is a triple-pole circuit breaker, the current is arranged to be measured from all three phases, and the breaking-off moment of the current is one common computational breaking-off moment of the currents of all phases.

16. An arrangement as claimed in claim 15, wherein the common computational breaking-off moment of the currents is a weighted average of the breaking-off moments of the currents that is arranged to be calculated from the formula $$T_{ABC}=K_1T_A+K_2T_B+K_3T_C,$$

where $T_{ABC}$ is the common computational breaking-off moment of the currents, $T_A$ is the breaking-off moment of the current of the phase, in which the current breaks off first $T_B$ is the breaking-off moment of the current of the phase, in which the current breaks off second and $T_C$ is the breaking-off moment of the current of the phase, in which the current breaks off last, and $K_1$, $K_2$ and $K_3$ are weighting coefficients.

17. An arrangement as claimed in claim 16, wherein the weighting coefficients of the breaking-off moments of the currents are arranged to be calculated from the formula $$K_1=A_1(T_B-T_A)/(T_C-T_A)$$

$$K_2=A_2$$

$$K_3=A_3(T_C-T_B)/(T_C-T_A).$$

18. An arrangement as claimed in claim 17, wherein $A_1$=0.4–0.6, $A_2$=0.4–0.6 and $A_3$=0.4–0.6, preferably $A_1 \approx 0.5$, $A_2 \approx 0.5$ and $A_3 \approx 0.5$.

19. An arrangement as claimed in claim 15, wherein the optimum closing moment of the circuit breaker is $$T_{OPTIMUM}=T_{ABC}+n*T,$$

where $T_{OPTIMUM}$ is the optimum closing moment of the circuit breaker, n is the number of entire network cycles to lapse from the common computational breaking-off moment of the phase currents before the circuit breaker is closed, n=1, 2, 3, . . . , and T is the time of one network cycle.

20. An arrangement as claimed in claim 19, wherein a control command to close the circuit breaker is arranged to be given at moment $$T_{ABC}+n*T-D$$

where

D is the operational delay of the circuit breaker.

21. An arrangement as claimed in claim 14, wherein the electrical network is a three-phase network, the circuit breaker is a single-pole controllable circuit breaker, the current is arranged to be measured from all three phases, and the breaking-off moments of the currents of all phases are arranged to be determined, and the circuit breaker is arranged to be closed in such a manner that in each phase, it closes at moment $$T_{OPTIMUM}=T_i+n*T,$$

where $T_i$ is the breaking-off moment of the current of a single phase, i=A, B or C, n is the number of entire network cycles to lapse from the breaking-off moment of the phase current before the circuit breaker is closed, n=1, 2, 3, . . . , and T is the time of one network cycle.

22. An arrangement as claimed in claim 14, wherein the electrical network is a one-phase network and the circuit breaker is arranged to be closed in such a manner that it closes at moment $$T_{OPTIMUM}=T_i+n*T,$$

where $T_i$ is the breaking-off moment of the current of the phase, i=A, B or C, n is the number of entire network cycles to lapse from the breaking-off moment of the phase current before the circuit breaker is closed, n=1, 2, 3, . . . , and T is the time of one network cycle.

23. An arrangement as claimed in claim 14, further comprising means for measuring the voltage of at least one phase, means for determining a momentary basic frequency of the network on the basis of the measurement of either the voltage or the current, and means for determining the time of the network cycle as an inverse of the momentary basic frequency of the network.

24. An arrangement as claimed in claim 14, wherein the network component is a transformer, arc suppression coil or any other electrical network component containing a ferromagnetic material.

25. An arrangement as claimed in claim 14, wherein the network component is a capacitor, a compensating capacitor, filter circuit or any other charged electrical network component.

26. An arrangement as claimed in claim 14, wherein the network part is a cable line or network.

* * * * *